(12) United States Patent
Oh et al.

(10) Patent No.: US 9,001,380 B2
(45) Date of Patent: Apr. 7, 2015

(54) PRINT CONTROLLING TERMINAL AND METHOD FOR COMPENSATING COLORS

(75) Inventors: Hyun-soo Oh, Suwon-si (KR);
Kyeong-man Kim, Yongin-si (KR);
Woo-jun Chung, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 939 days.

(21) Appl. No.: 12/929,462

(22) Filed: Jan. 26, 2011

(65) Prior Publication Data

US 2012/0038938 A1 Feb. 16, 2012

(30) Foreign Application Priority Data

Aug. 16, 2010 (KR) .............................. 2010-0078819

(51) Int. Cl.
*G06F 15/00* (2006.01)
*G03F 3/10* (2006.01)
*H04N 1/60* (2006.01)

(52) U.S. Cl.
CPC .................. *H04N 1/6058* (2013.01)

(58) Field of Classification Search
CPC .. H04N 1/6072; H04N 1/6058; H04N 1/6074
USPC ............. 358/1.9, 2.1, 520, 527, 525; 345/589
See application file for complete search history.

(56) References Cited

U.S. PATENT DOCUMENTS

| 5,604,610 | A | 2/1997 | Spaulding et al. |
| 6,803,921 | B1 | 10/2004 | Balasubramanian et al. |
| 2004/0257598 | A1 | 12/2004 | Fujio et al. |
| 2006/0001892 | A1* | 1/2006 | Bai ................................ 358/1.9 |
| 2006/0098220 | A1* | 5/2006 | Oh et al. ........................ 358/1.9 |
| 2006/0110031 | A1 | 5/2006 | Bala et al. |
| 2007/0279659 | A1* | 12/2007 | Hasegawa et al. ............. 358/1.9 |
| 2008/0013114 | A1* | 1/2008 | Hasegawa et al. ............. 358/1.6 |
| 2008/0246981 | A1 | 10/2008 | Ido |
| 2008/0297529 | A1 | 12/2008 | Shimbaru et al. |

FOREIGN PATENT DOCUMENTS

| CN | 1862445 A | 11/2006 |
| CN | 101093439 A | 12/2007 |
| EP | 0531891 A2 | 3/1993 |
| EP | 0793377 A2 | 9/1997 |
| EP | 1307042 A2 | 5/2003 |
| JP | 2008-72207 | 3/2008 |

OTHER PUBLICATIONS

European Search Report dated Dec. 1, 2011 issued in corresponding European Patent Application No. 11175153.3.
Chinese Office Action issued Dec. 1, 2014 in corresponding Chinese Patent Application No. 201110232562.5.

* cited by examiner

*Primary Examiner* — Benny Q Tieu
*Assistant Examiner* — Sunil Chacko
(74) *Attorney, Agent, or Firm* — Staas & Halsey LLP

(57) ABSTRACT

A present color compensating method includes receiving selection of an input ICC profile and an output ICC profile, receiving selection of a plurality of color rendering intents to be applied to an ICC profile, generating a color conversion table using the selected input ICC profile, the selected output profile, and the selected plurality of color rendering intents, and generating print data using the generated color conversion table.

14 Claims, 9 Drawing Sheets
(1 of 9 Drawing Sheet(s) Filed in Color)

PRINT CONTROLLING TERMINAL AND METHOD FOR COMPENSATING COLORS

CROSS-REFERENCE TO RELATED APPLICATIONS

This application claims priority from Korean Patent Application No. 2010-0078819, filed in the Korean Intellectual Property Office on Aug. 16, 2010, the disclosure of which is incorporated herein by reference.

BACKGROUND

1. Field

Aspects of the exemplary embodiments relate to a print controlling terminal and a method for compensating colors, and more particularly, to a print controlling terminal which generates a color conversion table according to user preference and generates print data using the generated color conversion table, and a method for compensating colors thereof.

2. Description of the Related Art

Generally, an image forming apparatus represents an apparatus which prints print data generated by a print controlling terminal such as a computer on a recording medium such as a printing paper. Examples of an image forming apparatus include a copy machine, printer, a fax machine, and Multi-Function Peripheral (MFP) which performs the above functions in a single device.

Since the color gamut of an image forming apparatus is smaller than that of a display apparatus, it is necessary to go through a color matching process to print RGB images of a print controlling terminal through an image forming apparatus. Therefore, each manufacturer provides an International Color Consortium (ICC) profile for their products so that color matching can be performed using the profile.

The ICC profile stores a color table including a color gamut mapping algorithm which is predetermined by a manufacturer of a generating device.

Conventionally, only one of three color rendering intents recommended by ICC is used to render and manage colors when the profile of an input apparatus is connected to the profile of an output apparatus.

Accordingly, it is not easy to reflect user preference. If a user desires to reflect his or her preference, the user has to edit an input/output profile or perform additional operation. In addition, in the related art method, it is difficult to predict a predetermined color rendering intent when connecting each input/output apparatus, which causes inconvenience to the user.

SUMMARY

An aspect of the exemplary embodiments relates to a print controlling terminal which generates a color conversion table according to user preference and generates print data using the generated color conversion table, and a method for compensating colors thereof.

A method for compensating colors in a print controlling terminal which is connectable to an image forming apparatus, according to an exemplary embodiment, includes receiving selection of an input ICC profile and an output ICC profile, receiving selection of a plurality of color rendering intents to be applied to an ICC profile, generating a color conversion table using the selected input ICC profile, the selected output profile, and the selected plurality of color rendering intents, and generating print data using the generated color conversion table.

The color rendering intent may be at least one of perceptual, relative colorimetric, saturation, and absolute colorimetric.

The method may further include receiving a setting of weighted values for each of the selected plurality of color rendering intents, and the generating a color conversion table may include generating a color conversion table by applying the set weighted values.

The method may further include displaying an expected print image of a test image in the image forming apparatus using a plurality of color rendering intents selected by a user.

The displaying an expected print image may include converting the text image into an image in a CIELab color space using the selected output ICC profile and the selected plurality of color rendering intents, inverting the test image which is converted into the CIELab color space image into a new RGB color space image using a selected input ICC profile, and displaying the inverted test image as an expected output image.

The method may further include storing the generated color conversion table.

The input ICC profile may be an ICC profile for the image forming apparatus, and the output ICC profile may be an ICC profile for a display apparatus connected to the print controlling terminal.

A print controlling terminal connectable to an image forming apparatus, according to an exemplary embodiment, includes an input unit which receives selection of a plurality of color rendering intents to be applied to an ICC profile, an input ICC profile and an output ICC profile, a color rendering unit which generates a color conversion table using the selected plurality of color rendering intents, the selected input ICC profile, and the selected output profile, a driver which generates print data using the generated color conversion table, and a communication interface unit which transmits the generated print data to the image forming apparatus.

The color rendering intent may be at least one of perceptual, relative colorimetric, saturation, and absolute colorimetric.

The input unit may receive a setting of weighted values for each of the selected plurality of color rendering intents, and the color rendering unit may generate a color conversion table by applying the set weighted values.

The print controlling terminal may further include a video driver which displays an expected print image of a test image in the image forming apparatus using a plurality of color rendering intents selected by a user.

The video driver may convert the text image into an image in a CIELab color space using the selected output ICC profile and the selected plurality of color rendering intents, invert the test image which is converted into the CIELab color space image into a new RGB color space image using a selected input ICC profile, and display the inverted test image as an expected output image.

The print controlling terminal may further include a video driver which displays a user interface window including a first area for receiving selection of an input ICC profile, a second area for receiving selection of an output ICC profile, and a third area for receiving a plurality of color rendering intents.

The user interface window may further include a fourth area for receiving selection of a test image and a fifth area for displaying an expected print image of the selected test image in the image forming apparatus.

The print controlling terminal may further include a storage unit which stores the generated color conversion table.

The input ICC profile may be an ICC profile for the image forming apparatus, and the output ICC profile may be an ICC profile for a display apparatus connected to the print controlling terminal.

The print controlling terminal connectable to an image forming apparatus, according to another exemplary embodiment, includes a User Interface (UI) generating unit which generates a user interface window including a first area for receiving selection of an input ICC profile, a second area for receiving selection of an output ICC profile, and a third area for receiving a plurality of color rendering intents, a color rendering unit which generates a color conversion table using a plurality of color rendering intents selected through the user interface window, an input ICC profile and an output ICC profile, and a driver which generates print data using the generated color conversion table.

The user interface window may further include a fourth area for receiving selection of a test image and a fifth area for displaying an expected print image of the selected test image in the image forming apparatus.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The above and/or other aspects of the present disclosure will be more apparent by describing certain present disclosure with reference to the accompanying drawings, in which.

DETAILED DESCRIPTION

Figure 1:
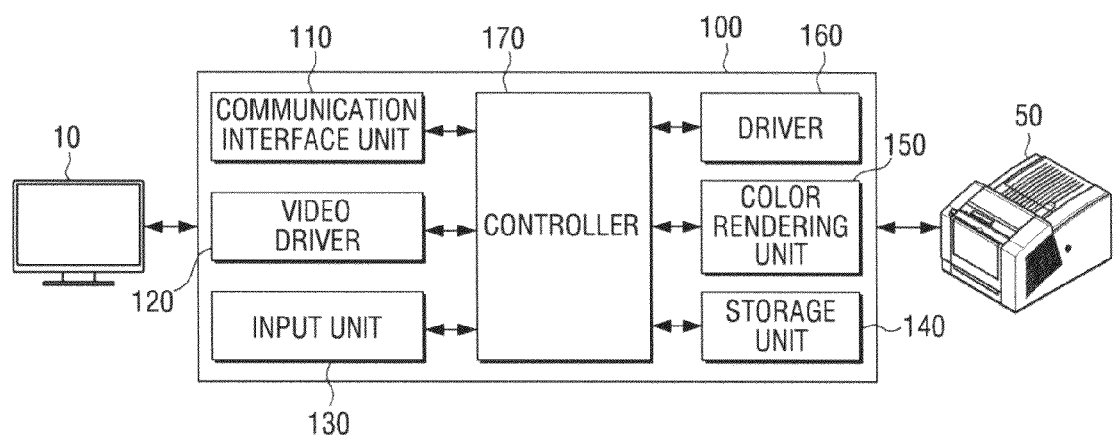
FIG. 1 is a block diagram illustrating a print controlling terminal according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram illustrating a print controlling terminal according to an exemplary embodiment.

Referring to FIG. 1, a print controlling terminal 100 comprises a communication interface unit 110, a video driver 120, an input unit 130, a storage unit 140, a color rendering unit 150, a driver 160, and a controller 170.

The communication interface unit 110 is connected to an image forming apparatus 50 and transmits print data to the image forming apparatus 50. Specifically, the communication interface unit 110 is formed to connect the print controlling terminal 100 to an external apparatus and may be connected to the image forming apparatus not only through a Local Area Network (LAN) and an Internet network but also through a Universal Serial Bus (USB) port. In addition, the communication interface unit 110 may transmit print data generated by the driver 160 to the image forming apparatus 50. The driver 160 will be explained later.

The video driver 120 supports interface between the print controlling terminal 100 and a display apparatus 10 and transmits image data to the display apparatus 10 so that the image can be displayed on the display apparatus. Herein, the display apparatus 10 is an apparatus which displays an image provided by the print controlling terminal 100 and may include a Cathode Ray Tube (CRT) display apparatus and a Liquid Crystal Display (LCD).

In addition, the video driver 120 may control the display apparatus 10 to display soft-proofing result of a test image. Herein, the soft-proofing represents a technology to render image colors of a test image in a display apparatus when the test image is output through the image forming apparatus 50. Specifically, soft-proofing may be performed by converting a test image into a CIELab color space image using a selected output ICC profile and a plurality of selected color rendering intents, inverting the test image which is converted into the CIELab color space image into a new RGB color space image using a selected input ICC profile, and displaying the inverted test image as an expected output image. In the exemplary embodiment, CIELab is used as a color space, but CIBXYZ may also be used as a color space.

The input unit 130 has a plurality of function keys through which a user may set or select various functions supported by the print controlling terminal 100, and may receive various setting or selection from the user. In addition, the input unit 130 may display a user interface window for performing color matching.

Specifically, the input unit 130 may receive one of a plurality of output ICC profiles and one of a plurality of input ICC profiles, which are selected by a user. In addition, the input unit 130 may receive selection of a plurality of color rendering intents to be applied to an ICC profile. The input unit 130 may also receive a weighted value of each of the plurality of selected color rendering intents. The user interface window generated by the video driver 120 for receiving selection of a user will be explained with reference to FIGS. 3 to 5. As described above, the video driver 120 generates a user interface window and thus may be referred to as a UI generating unit.

In FIG. 1, the display apparatus 10 and the print controlling terminal 100 are illustrated as separate apparatuses from each other, but this is only an example. The display apparatus 10 may be included in the print controlling terminal 100, or the display apparatus 10, the video driver 120 and the input unit may be configured in a single apparatus which may perform input and output simultaneously such as a touch pad.

The storage unit 140 stores an ICC profile (that is, an input ICC profile) of the display apparatus 10 and an ICC profile (that is, an output ICC profile) of the image forming apparatus 50. In addition, the storage unit 140 may store a color conversion table generated by the color render unit 150 which will be explained later. The storage unit 140 may be embodied as a storing medium in the print controlling terminal 100 or an external storing medium such as a removable disk including a USB memory or a web server through a network.

Herein, the ICC profile is set by the International Color Consortium to render intrinsic colors of an original image regardless of color rendering properties of input/output apparatuses and various image conversions, and refers to a digital file which defines the relations between a device-dependent color space and a device-independent color space in the form of a mathematical modeling or a look-up table.

The device-dependent color space is color coordinates which represent a digital control signal as a specific bit such as 8 bit or 10 bit to define colors rendered by an input/output apparatus quantitatively, and RGB, CMY, or CMYK color space is usually employed according to a color rendering method of an output apparatus or the number of primary colors. Since the device-dependent color space represents colors of an input/output apparatus only as a combination of values of a digital control signal, intrinsic colors rendered by an apparatus cannot be reflected. In addition, an image having the same color coordinates in the device-dependent color space may have different colors when the image is output through an output apparatus which has different color rendering properties.

The device-independent color space is color coordinates which represent color stimulus specification recognized by human eyes quantitatively, and may reflect the same color values regardless of color rendering properties of an output apparatus, and color coordinates such as sRGB, CIEXYZ, or CIELab is usually employed.

Color rendering intent defines how to change a gamut of color when a color gamut obtained in one medium is rendered in another medium having a different color gamut, and may include perceptual, relative colorimetric, saturation, and absolute colorimetric.

First of all, the perceptual intent is to match color gamut of two different output apparatuses by scaling the color gamut proportionally, and is most useful in representing a photo image.

The relative colorimetric is to handle out-of-gamut color of an output apparatuses by gamut mapping to the edge of color gamut of the output apparatus, and is most useful in representing a logo which is most similar colorimetrically or an image object.

The saturation is to handle out-of-gamut color of an output apparatus by gamut mapping to the highest chroma, and is most useful in representing a business graphic object which requires vivid color rendering rather than accurate color rendering.

Unlike the relative colorimetric, the absolute colorimetric aims to achieve accurate color rendering without mapping media white points, and is used mostly for soft-proofing.

The color rendering unit 150 may generate a color conversion table using a plurality of selected color rendering intents. Specifically, the color rendering unit 150 converts weighted values set by the plurality of selected color rendering intents from among input ICC profiles using Equation 1 below, and converts weighted values set by the selected color rendering intents from among output ICC profiles using Equation 1 below. In addition, the color rendering unit 150 may generate a color conversion table using a converted input ICC profile and a converted output ICC profile.

$$C = \frac{(Cr*Wr + Cs*Ws)}{(Wr+Ws)}, M = \frac{(Mr*Wr + Ms*Ws)}{(Wr+Ws)},$$
$$Y = \frac{(Yr*Wr + Ys*Ws)}{(Wr+Ws)}, K = \frac{(Kr*Wr + Ks*Ws)}{(Wr+Ws)}$$
[Equation 1]

Herein, Cr, Mr, Yr, and Kr refer to CMYK (Relative) values, Cs, Ms, Ys, and Ks refer to CMYK (Saturation) values, Wr refers to a weighted value of Relative, and Ws refers to a weighted value of Saturation. In Equation 1, examples of using only relative colorimetric and saturation are described, but other color rendering intents may also be used. For example, a weighted value may be applied to more than three color rendering intents.

The driver 160 supports interface between the print controlling terminal 100 and the image forming apparatus 50, and converts print data that a user wishes to print into print data in a language which can be recognized by the image forming apparatus 50.

In addition, the driver 160 may generate print data using a generated color conversion table.

The controller 170 controls each component of the print controlling terminal 100. Specifically, if a user's command is received or a predetermined time is reached, the controller 170 controls to perform the above-mentioned operations to generate a color conversion table which reflects user preference. If the color conversion table is generated, the controller 170 may control the driver 160 to generate print data according to the generated color conversion table.

Figure 2:
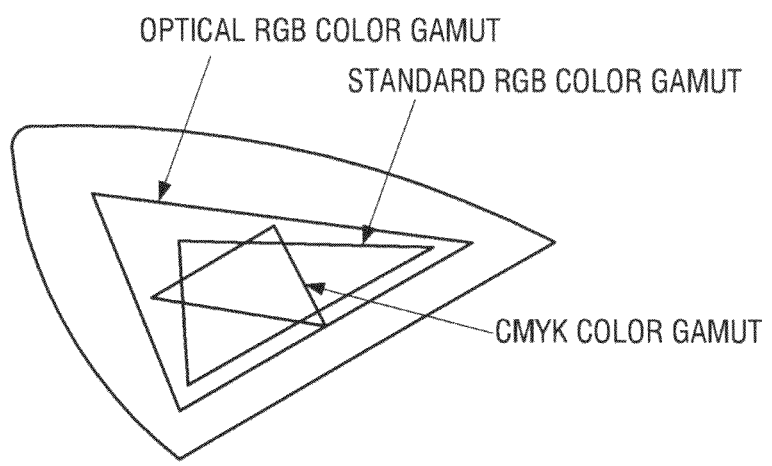
FIG. 2 is a view illustrating a color gamut between a display apparatus and an image forming apparatus according to an exemplary embodiment.

FIG. 2 is a view illustrating a color gamut between the display apparatus 10 and the image forming apparatus 50 according to an exemplary embodiment.

FIG. 2 illustrates a color gamut which can be rendered by the display apparatus 10 using image data in an RGB color space and by the image forming apparatus 50 using color image data in a CMYK (cyan, magenta, yellow, and black) color space.

An apparatus which generates and displays a color image, such as a digital camera, a scanner, a monitor, and an image forming apparatus, uses a color space which is different from each other, and each of the digital image apparatuses has different color gamut for rendering colors.

For example, as illustrated in FIG. 1, the display apparatus 10 uses image data in an RGB color space while the image forming apparatus 50 uses image data in a CMYK color space. In addition, the display apparatus 10 may represent broader color gamut that the image forming apparatus 50. Since color space of each digital image apparatus is different from each other, color space of a digital image apparatus may be referred to as device-dependent color space.

As each digital image apparatus has different color space and different color gamut from each other, color space and color gamut of a digital image apparatus and an output digital image apparatus should match with each other in order to output the same image in an output digital image apparatus.

Therefore, according to an exemplary embodiment, the color rendering unit 150 may generate a color conversion table which is a color gamut matching algorithm using an ICC profile selected by a user from among ICC profiles applicable to the display apparatus 10 and an ICC profile selected by a user from among ICC profiles applicable to the image forming apparatus 50.

Figure 3:
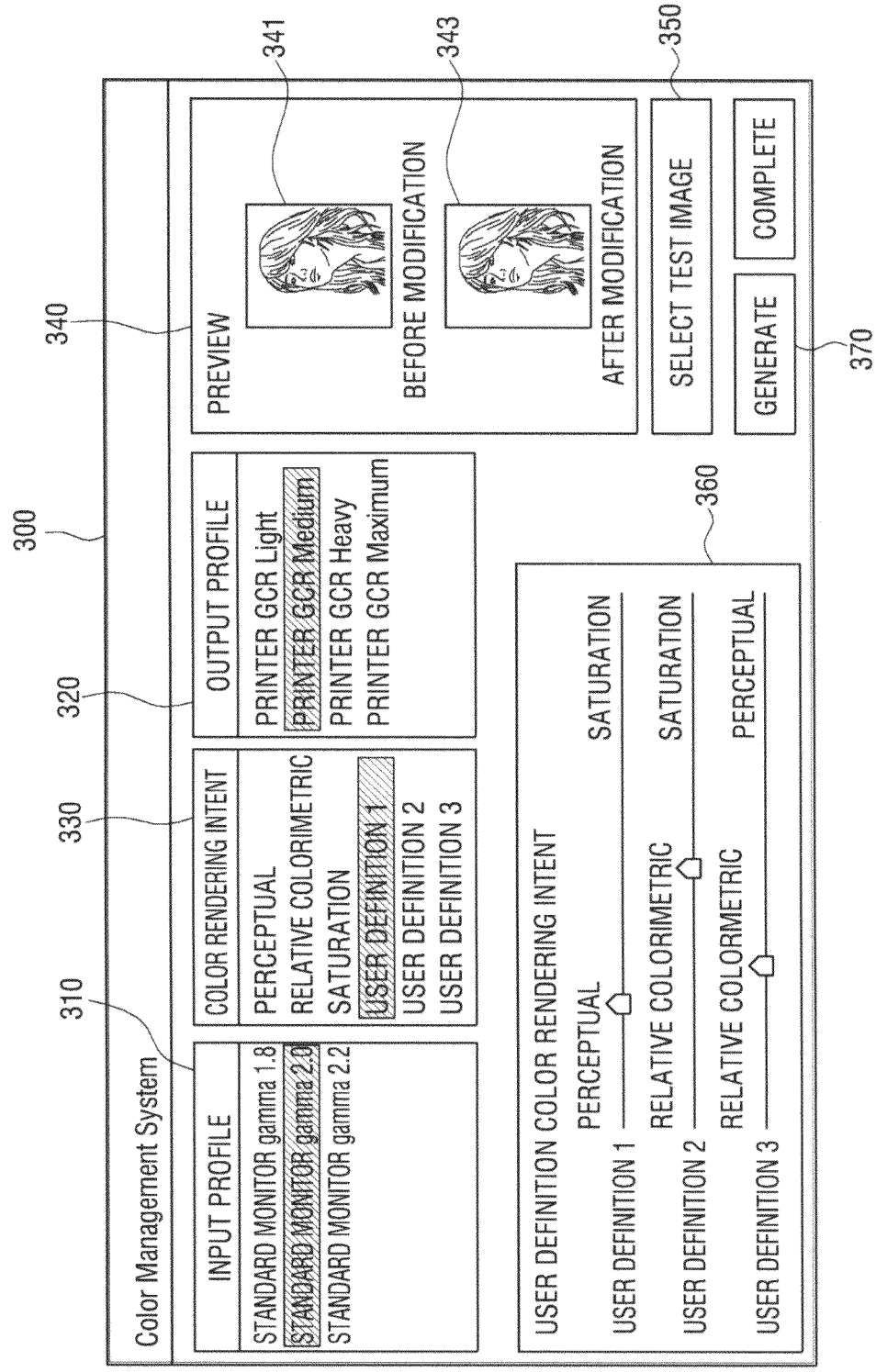
FIGS. 3 to 5 are views illustrating various examples of a user interface window provided by a print controlling terminal according to an exemplary embodiment.
Figure 4:
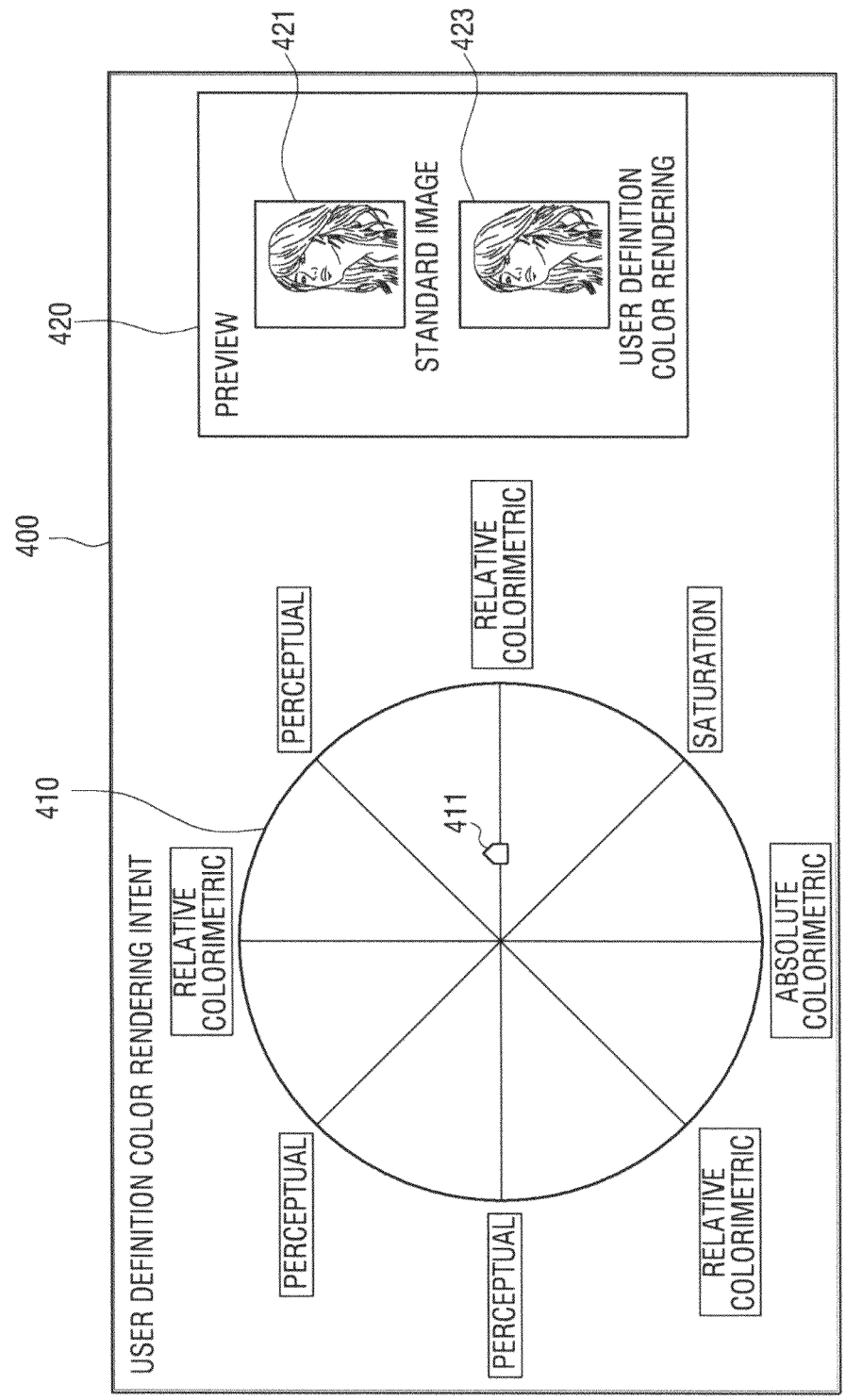
Figure 5:
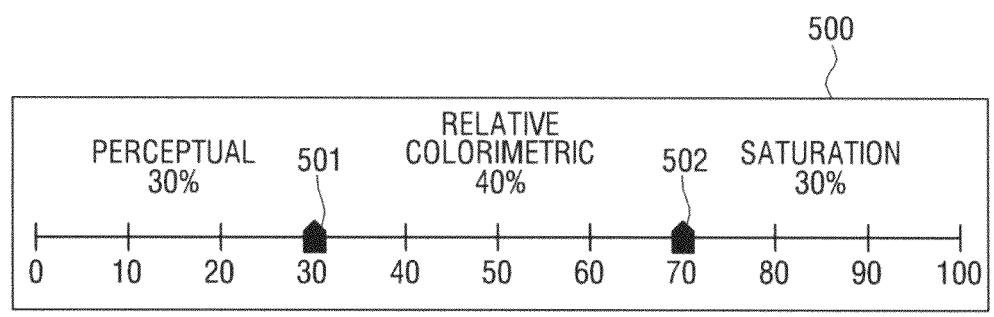

FIGS. 3 to 5 are views illustrating various examples of a user interface window provided by the print controlling terminal 100 according to an exemplary embodiment.

Referring to FIG. 3, a user interface window 300 comprises a first area 310 for receiving selection of an input ICC profile, a second area 320 for receiving selection of an output ICC profile, a third area 330 for receiving selection of a color rendering intent, a fourth area 350 for receiving selection of a test image, a fifth area 340 for displaying an expected print image of a selected test image in the image forming apparatus 50, a sixth area 360 for receiving a setting of weighted value for each of a plurality of color rendering intents, and a seventh area 370 for selecting to generate the print image.

Specifically, the first area 310 receives an input ICC profile and displays a plurality of input ICC profiles applicable to the display apparatus 10. The first area 310 receives one input ICC profile selected by a user from among a plurality of displayed input ICC profiles.

The second area 320 receives an output ICC profile and displays a plurality of output ICC profiles applicable to the image forming apparatus 50. The second area 320 may receive one output ICC profile selected by a user from among a plurality of display output ICC profiles.

The third area 330 receives a color rendering intent and displays perceptual, relative colorimetric, saturation and combination of the above color rendering intents from among color rendering intents. The third area 330 may receive one of the above color rendering intents, which is selected by a user.

The fourth area 350 receives a test image. If a user selects the fourth area 350, a plurality of text images stored in the storage unit 140 of the print controlling terminal 100 are displayed and the user may select one text image from among the plurality of the displayed test images.

The fifth area 340 displays an expected print image of a selected test image 341 in the image forming apparatus 50, and soft-proofing result 343 of the text image selected in the fourth area 350 may be displayed.

The sixth area 360 receives a setting of a weighted value for each of a plurality of color rendering intents. Specifically, user definition area 1 where perceptual and saturation are combined, user definition area 2 where relative colorimetric and saturation are combined, and user definition area 3 where relative colorimetric and perceptual are combined are displayed.

For example, if a user wishes to employ a saturation color for colors with high chroma while maintaining perceptual for basic colors, the user may select user definition area 1 where perceptual and saturation are combined. On the other hand, if a user wishes to employ a saturation color for colors with high chroma while maintaining relative colorimetric for basic colors, the user may select user definition area 2 where relative colorimetric and saturation are combined.

FIG. 3 illustrates an example of receiving weighted values for three combinations. However, weighted values may be received for four combinations as illustrated in FIG. 4 or weighted values may be received for more than three color rendering intents. In addition, weighted values may be set in a form which is different from those illustrated in FIG. 3 to FIG. 5.

Specifically, referring to FIG. 4, a user may set weighted values for four combinations by manipulating a movement bar 411 in the first area 410 of a user interface window 400 so that the second area 420 displays a preview of a standard image of a selected test image 421 applicable to the image forming apparatus 50, and a modified image 423 after user defined color rendering. Referring to FIG. 5, in a user interface window 500, a user may set weighted values for each of three color rendering intents by manipulating movement bars 501, 502.

Figure 6:
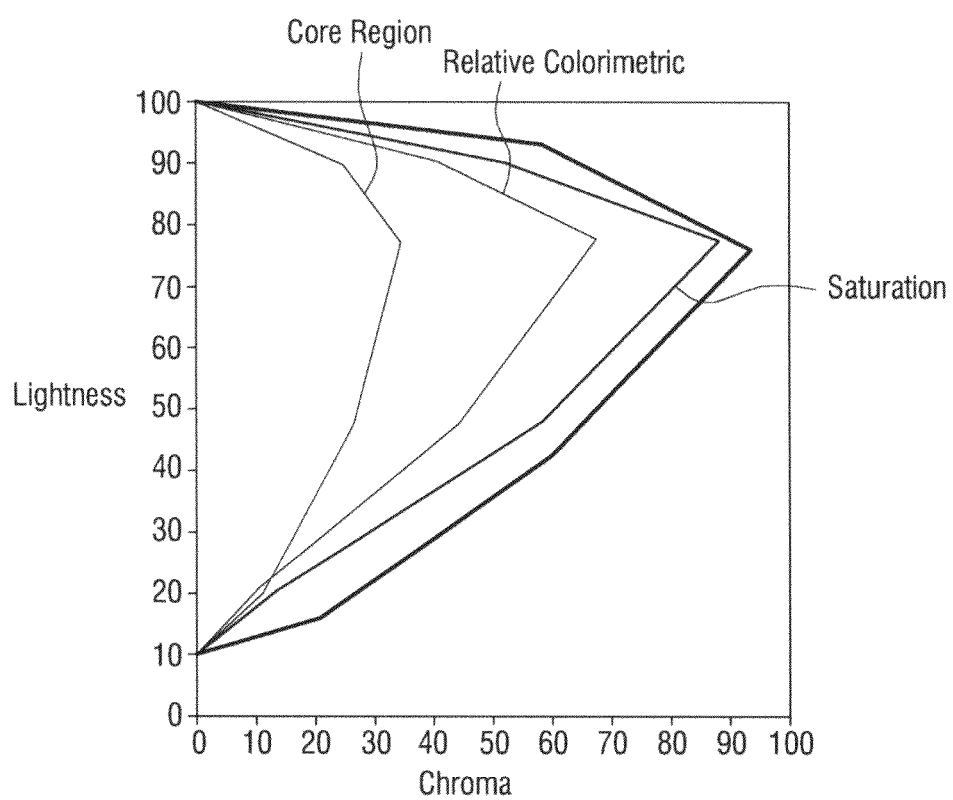
FIG. 6 is a view illustrating an example of a filter according to an exemplary embodiment.

FIG. 6 is a view illustrating an example of a filter according to an exemplary embodiment.

Figure 7:
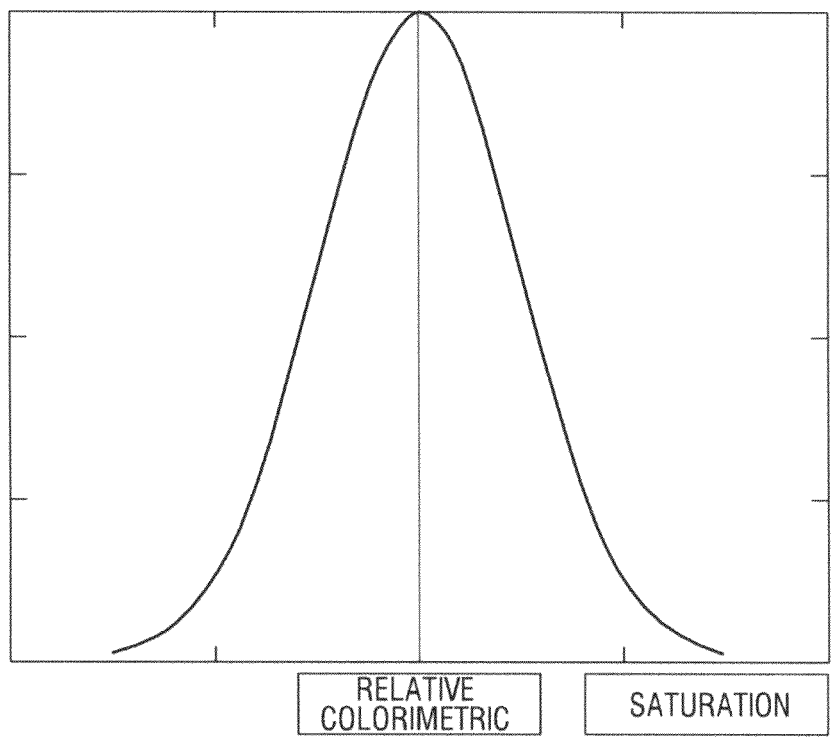
FIG. 7 is a view illustrating an example of performing mapping using nonlinear filter.

Referring to FIG. 6, the color rendering unit 150 may perform mapping using a nonlinear filter (Gaussian form) illustrated in FIG. 7 so that grey color and skin color which are sensible to human perception maintain a basic table and other colors have weighted values set through a user interface window.

Figure 8:
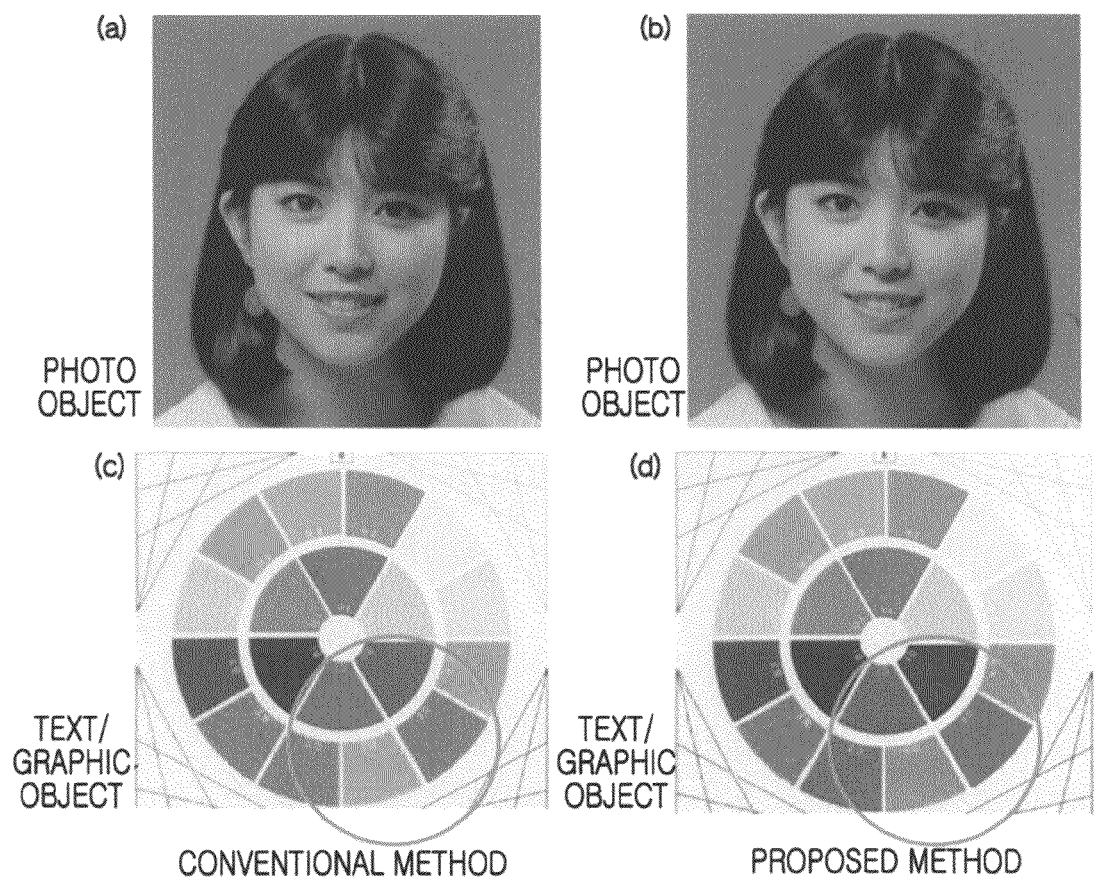
FIG. 8, parts (a)-(d), are views illustrating an example of output when a method for compensating colors is used according to an exemplary embodiment.

FIG. 8, parts (a)-(d), are views illustrating an example of output when a method for compensating colors is used according to an exemplary embodiment.

Specifically, FIG. 8, parts (a) and (c), illustrate an example of an output image when color matching is performed using a related art method, and FIG. 8, parts (b) and (d), illustrate an example of an output image when color matching is performed using a plurality of color rendering intents according to an exemplary embodiment. Comparing FIG. 8, parts (a) and (c), with FIG. 8, parts (b) and (d), it can be seen that in an image with a plurality of objects, the output image according to an exemplary embodiment has an image quality which reflects user preference better than the output image according to a related art method.

Figure 9:
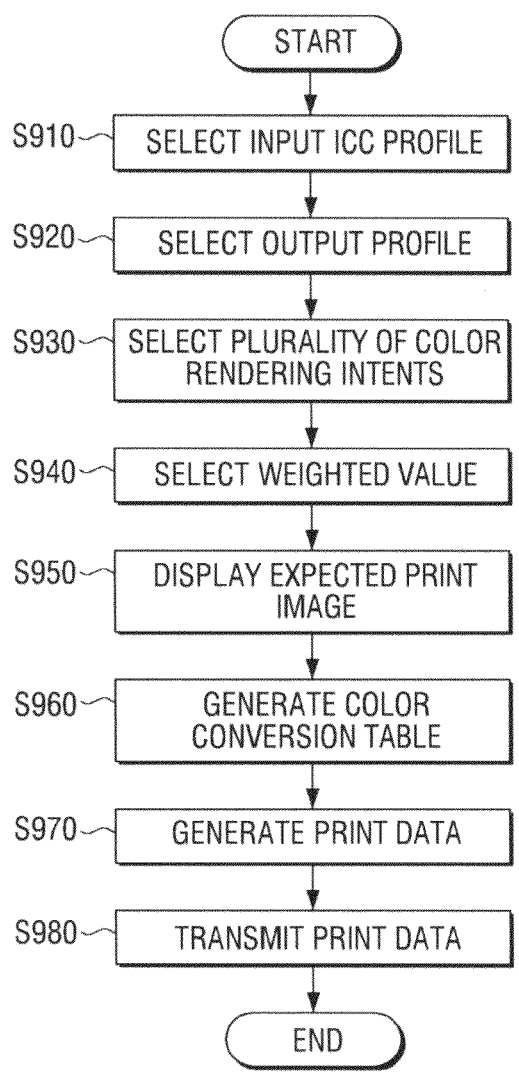
FIG. 9 is a flowchart to explain a method for compensating colors according to an exemplary embodiment.

FIG. 9 is a flowchart to explain a method for compensating colors according to an exemplary embodiment.

Referring to FIG. 9, first of all, an input ICC profile is selected (S910). Specifically, one ICC profile from among a plurality of ICC profiles applicable to the display apparatus 10 may be selected by a user.

An output ICC profile is selected (S920). Specifically, one ICC profile from among a plurality of ICC profiles applicable to the image forming apparatus 50 may be selected by a user.

Subsequently, a plurality of color rendering intents are selected (S930). Specifically, more than two color rendering intents from among perceptual, relative colorimetric, saturation, and absolute colorimetric may be selected, and weighted values for each of the plurality of the selected color rendering intents are set (S940).

In the exemplary embodiment, an input ICC profile, an output ICC profile, a color rendering intents, and a weighted value are selected consecutively, but the order selection may be changed.

Subsequently, a preview screen for a plurality of color rendering intents selected by a user is displayed (S950). Specifically, soft-proofing may be performed as described above using the color rendering intents selected by a user, and soft-proofing result may be displayed on a preview screen.

A color conversion table is generated using the plurality of selected color rendering intents, the selected input ICC profile, the selected output ICC profile, and the set weighted values (S960). The detailed operation of generating a color conversion table will not be explained further since the operation has already been explained with respect to the color rendering unit 150 in FIG. 1.

Subsequently, print data is generated using the generated color conversion table (S970), and the generated print data is transmitted to the image forming apparatus 50 to perform printing (S980).

The method for compensating colors, according to an exemplary embodiment, generates a color conversion table by combining a plurality of color rendering intents and thus, user preference may be reflected while compensating colors. The color compensating method illustrated in FIG. 9 may be performed not only in a print controlling terminal having the configuration illustrated in FIG. 1 but also in a print controlling terminal having other configurations.

Although a few embodiments have been shown and described, it would be appreciated by those skilled in the art that changes may be made in this embodiment without departing from the principles and spirit of the invention, the scope of which is defined in the claims and their equivalents.

What is claimed is:

1. A method for compensating colors in a print controlling terminal which is connectable to an image forming apparatus, the method comprising:

receiving selection of an input International Color Consortium (ICC) profile and an output ICC profile;

receiving selection of a plurality of color rendering intents to be applied to an ICC profile and a setting of weighted values for each of the selected color rendering intents, the setting of weighted values including at least a first weighting between perceptual and saturation, a second weighting between relative colorimetric and saturation, and a third weighting between relative colorimetric and perceptual;

generating a color conversion table using the selected input ICC profile, the selected output profile, and the selected plurality of color rendering intents by applying the set weighted values; and generating print data using the generated color conversion table.

2. The method as claimed in claim 1, further comprising: displaying an expected print image of a test image in the image forming apparatus using a plurality of color rendering intents selected by a user.

3. The method as claimed in claim 2, wherein the displaying an expected print image comprises converting the text image into an image in a CIELab color space using the selected output ICC profile and the selected plurality of color rendering intents, inverting the test image which is converted into the CIELab color space image into a new RGB color space image using a selected input ICC profile, and displaying the inverted test image as an expected output image.

4. The method as claimed in claim 1, further comprising storing the generated color conversion table.

5. The method as claimed in claim 1, wherein the input ICC profile is an ICC profile for the image forming apparatus, and the output ICC profile is an ICC profile for a display apparatus connected to the print controlling terminal.

6. A print controlling terminal connectable to an image forming apparatus, comprising:

an input unit which receives selection of a plurality of color rendering intents to be applied to an International Color Consortium (ICC) profile, an input ICC profile and an output ICC profile and receives a setting of weighted values for each of the selected color rendering intents, the setting of weighted values including at least a first weighting between perceptual and saturation, a second weighting between relative colorimetric and saturation, and a third weighting between relative colorimetric and perceptual;

a color rendering unit which generates a color conversion table using the selected plurality of color rendering intents, the selected input ICC profile, and the selected output profile by applying the set weighted values;

a driver which generates print data using the generated color conversion table; and a communication interface unit which transmits the generated print data to the image forming apparatus.

7. The print controlling terminal as claimed in claim 6, further comprising:

a video driver which displays an expected print image of a test image in the image forming apparatus using a plurality of color rendering intents selected by a user.

8. The print controlling terminal as claimed in claim 7, wherein the video driver converts the text image into an image in a CIELab color space using the selected output ICC profile and the selected plurality of color rendering intents, inverts the test image which is converted into the CIELab color space image into a new RGB color space image using a selected input ICC profile, and displays the inverted test image as an expected output image.

9. The print controlling terminal as claimed in claim 6, further comprising:

a video driver which displays a user interface window including a first area for receiving selection of an input ICC profile, a second area for receiving selection of an output ICC profile, and a third area for receiving a plurality of color rendering intents.

10. The print controlling terminal as claimed in claim 9, wherein the user interface window further includes a fourth area for receiving selection of a test image and a fifth area for displaying an expected print image of the selected test image in the image forming apparatus.

11. The print controlling terminal as claimed in claim 6, further comprising a storage unit which stores the generated color conversion table.

12. The print controlling terminal as claimed in claim 6, wherein the input ICC profile is an ICC profile for the image forming apparatus, and the output ICC profile is an ICC profile for a display apparatus connected to the print controlling terminal.

13. A print controlling terminal connectable to an image forming apparatus, comprising:

a User Interface (UI) generating unit which generates a user interface window including a first area for receiving selection of an input International Color Consortium (ICC) profile, a second area for receiving selection of an output ICC profile, a third area for receiving a plurality of color rendering intents, and a fourth area for receiving a setting of weighted values for each of the received color rendering intents, the fourth area including at least a first user definition area in which perceptual and saturation are combined, a second user definition area in which relative colorimetric and saturation are combined, and a third user definition area in which relative colorimetric and perceptual are combined;

a color rendering unit which generates a color conversion table using a plurality of color rendering intents selected through the user interface window, an input ICC profile and an output ICC profile by applying the received weighted values; and a driver which generates print data using the generated color conversion table.

14. The print controlling terminal as claimed in claim 13, wherein the user interface window further includes a fifth area for receiving selection of a test image and a sixth area for displaying an expected print image of the selected test image in the image forming apparatus.

* * * * *